United States Patent [19]
Madlener

[11] Patent Number: 5,804,240
[45] Date of Patent: Sep. 8, 1998

[54] JUICE PACKAGING PROCESS AND APPARATUS

[75] Inventor: August Madlener, Santa Isabel, Puerto Rico

[73] Assignee: Alipak Corporation, Santa Isabel, Puerto Rico

[21] Appl. No.: 580,835

[22] Filed: Dec. 29, 1995

[51] Int. Cl.⁶ .................... A23L 3/00; B65B 55/14
[52] U.S. Cl. .................... 426/410; 426/399; 426/415; 426/127; 99/483; 53/167; 422/243
[58] Field of Search .................... 426/399, 410, 426/415, 127, 521; 99/483; 53/167, 127, 440; 422/243

[56] References Cited

U.S. PATENT DOCUMENTS

| | | |
|---|---|---|
| 2,187,572 | 1/1940 | Meinzer . |
| 2,325,360 | 7/1943 | Avers . |
| 2,327,732 | 8/1943 | McKinnis . |
| 2,517,569 | 8/1950 | Huzenlaub . |
| 2,549,216 | 4/1951 | McKmartin . |
| 4,355,721 | 10/1982 | Krlott et al. .................... 426/113 |
| 4,376,183 | 3/1983 | Haskell . |
| 4,925,686 | 5/1990 | Kastin . |
| 5,242,701 | 9/1993 | Poole . |
| 5,494,691 | 2/1996 | Sizer . |

FOREIGN PATENT DOCUMENTS

| | | | |
|---|---|---|---|
| 2604009 | 8/1977 | Germany | 426/399 |
| 2120077 | 11/1983 | United Kingdom | 426/399 |

OTHER PUBLICATIONS

Canadian Packaging 1988, 41, (6) 32–33 (Dialog Abstract).
Food and Drug Packaging 49(4) Apr. 1985, pp. 1, 67 (Dialog Abstract).
Packaging vol. 29, No. 10,9/84 p. 11 (Dialog Abstract), Sep. 1984.
Food Processing, USA, 1986, 47(12) 154–156 (Dialog Abstract).
Cereal Foods World Jul. 1987 p. 504 (Dialog Abstract).
Beverage World vol. 102, No. 1317 Sep. 1983 pp. 42–43 (Dialog Abstract).
South African Food Review 1982 9(6) 29–30 (Dialog Abstract).

*Primary Examiner*—Steven Weinstein
*Attorney, Agent, or Firm*—Huntley & Associates

[57] ABSTRACT

Process and apparatus for packaging beverages such as fruit juice provides plastic pouches filled with juice and sealed to form containers that are shelf stable for extended periods. The process involves limited heating, holding and cooling times for the juice. Preferred film for the pouches includes a multilayer construction having a barrier core and heat sealable outer layers.

15 Claims, 1 Drawing Sheet

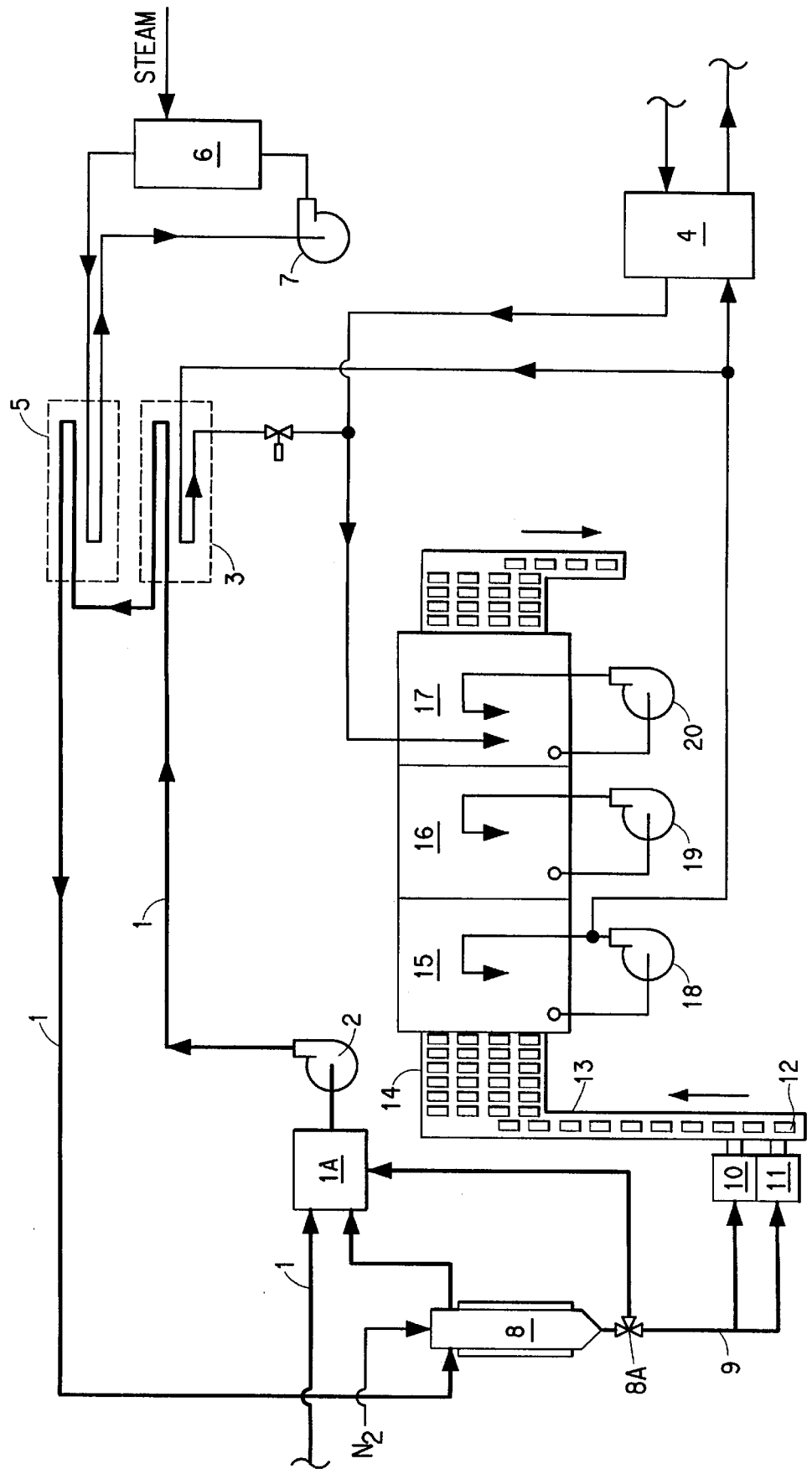
FIGURE

JUICE PACKAGING PROCESS AND APPARATUS

BACKGROUND OF THE INVENTION

This invention relates generally to beverages and more particularly to a process and apparatus for preparing and packaging beverages such as fruit juices, resulting in a final product which is shelf stable and remains so without refrigeration for six months or longer.

There is a constant need in the food processing industry for products which are resistant to decomposition and aging but do not contain additives and preservatives. The cost of transporting and storing all natural food products can be significant, especially if refrigeration is necessary. These costs are transferred to the consumer, and accordingly, all natural products such as fruit juice can be expensive, as well as being susceptible to long transportation or storage periods. Consequently, there is a demand for a process whereby perishable food products such as all-natural juices can be made shelf stable at room temperatures, thereby retaining the natural flavor, color, texture, odor, and vitamin content of the packaged product for longer time periods with less energy, packaging or other costly requirements.

SUMMARY OF THE INVENTION

The present invention satisfies the above needs by providing an improved process for preparing and packaging beverages such that the preservative and additive free packaged product can be transported and stored for long time periods without the need for refrigeration.

Specifically, the instant invention provides a process for the packaging of beverage comprising:

(a) heating the beverage to a temperature of about from 185° to 205° F. in a closed conduit;

(b) maintaining the temperature of the beverage within the conduit for about from 0.5 to 3 minutes;

(c) passing the heated beverage into a distribution tank having a height to diameter ratio of at least about 5 to 1 in which the beverage is maintained at a substantially constant level;

(d) passing the beverage from the distribution tank by at least one conduit to fill pouches of polymeric film;

(e) sealing the top of each pouch to form a container;

(f) maintaining each container at ambient conditions for at least about 1 minute; and (g) contacting each container for at least about 2 minutes with fluid maintained at a temperature below about 100° F. to cool the beverage in the container to a temperature of less than about 100° F.

The instant invention further provides an apparatus for carrying out the process comprising:

(a) means for heating the beverage to a temperature of about from 185° to 205° F. in a closed conduit;

(b) means for maintaining the temperature of the beverage within the conduit for about from 0.5 to 3 minutes;

(c) means for passing the heated beverage into a distribution tank having a height to diameter ratio of at least about 5 to 1 in which the beverage is maintained at a substantially constant level;

(d) means for passing the beverage from the distribution tank by at least one conduit to fill pouches of polymeric film;

(e) means for sealing the top of each pouch to form a container;

(f) means for maintaining each container at ambient conditions for at least about 1 minute; and (g) means for cooling each container for at least about 2 minutes by contacting with fluid at a temperature below about 100° F. to cool the beverage in the container to a temperature of less than about 100° F.

BRIEF DESCRIPTION OF THE DRAWING

The drawing is a schematic representation of a process and apparatus of the present invention.

DETAILED DESCRIPTION OF THE INVENTION

The present invention is applicable to a variety of beverages, including fruit juices and beverages containing mixes thereof. The invention is particularly applicable to 100% natural fruit juices, which, without preservatives or other additives, have been particularly difficult to package to provide long term stability in a low cost container. The following description, for convenience, refers to juice or fruit juice.

The operation of the present process and apparatus will be more fully understood by reference to the drawing, in which the beverage, such as fruit juice is introduced from a cooled storage vessel, not shown, into conduit 1 to balance tank 1A and pressurized through pump means 2. The juice is then heated to a temperature of about from 185° to 20° F. Preferably, and as shown in the drawing, this heating is carried out in two stages. The juice is first passed through a first heat exchanger 3, which is supplied with a fluid such as water from cooling tunnel described below. The fluid is typically at a temperature of about from 80° to 90° F., which, while cooler than the desired temperature range for pasteurization of the juice, elevates the temperature of the previously refrigerated juice. The conduit continues to second heat exchanger 5, which is supplied with a hot fluid such as water from reservoir 6 and pump 7. After heating the juice to the desired temperature range of about from 185° to 205° F., its residence time within the conduit, in general, is about from 0.5 to 3 minutes. With usual pumping pressures and flow, the temperature of the juice can be maintained within the desired temperature range with conventional insulation for the conduit.

The heated juice is then introduced into distribution tank 8. The configuration of the tank is an important feature of the present invention, and the tank has a height to diameter ratio of at least about 5 to 1, and preferably at least about 8 to 1. The tank is typically jacketed to maintain the temperature of the juice. The level of juice in the tank should remain substantially constant, and can be maintained by appropriate regulating means, such as a sensor at the bottom of the tank operatively connected to either or both of a regulating inlet valve or a variable speed pump. The combination of the configuration of the tank and the substantially constant level of juice in the tank insures a substantially constant flow of heated juice through the distribution tank. Accordingly, all juice processed through the tank is maintained in the tank for substantially the same period. In general, the level in the distribution tank should vary by less than about 10% to maintain the fill weight of juice in each pouch.

The distribution tank is preferably further equipped with valving and sensing devices at 8A. The valving and sensing devices are operatively connected to maintain the level and temperature of juice in the distribution tank, and the devices can divert juice through valving at the bottom of the distribution tank, which may also lead to the filling stations. If the pressure sensing devices detect pressure in the distribution tank that is below a predetermined level required to fill the pouches to the desired level, the valve at the top of the tank will open until the level is restored. This is particularly important if the pouches are gravity filled. If the level in the distribution tank becomes too high, the juice will overflow back into the balance tank. Similarly, if the temperature of the juice in the distribution tank is below the minimum required temperature of about 185° F., the valving devices will divert the juice into the balance tank until the juice reaches the required temperature. Juice packaged below the required temperature will not have the desired shelf stability due to fermentation of remaining microorganisms during storage.

To minimize exposing the juice to oxygen while it is in the distribution tank, to the extent that a head space is permitted between the juice and the top of the distribution tank, it is preferred that this space be filled with nitrogen or other inert gas. Similarly, if head space is provided in the filled pouches, it is preferably filled with inert gas, especially nitrogen. Specifically, the head space in the filled pouches preferably comprises a nitrogen concentration greater than ambient air, that is, greater than about 80%.

The juice passes from the tank through at least one feeder or filler tube 9 leading to filling stations 10 and 11. These can be vertical form-fill-seal machines of the type commercially available in the film packaging industry. In these filling stations, pouches of heat-sealable thermoplastic film are filled with juice and heat sealed by conventional means, not shown, and the resulting containers 12 are then passed to first conveyor 13 on which they are maintained at ambient conditions for about from 0.5 to 3 minutes, and preferably about from 1 to 2 minutes. Maintenance of the containers at ambient conditions for shorter periods of time can be detrimental to the pasteurization process, and depreciate the long term stability of the juice, while maintenance for longer periods of time can depreciate the flavor, color, taste, and other characteristics of the juice.

During or at the completion of the maintenance period, the containers can be transferred onto second conveyor 14, on which they are transported into a cooling tunnel, typically having at least three stations. Each station of the cooling tunnel has spray apparatus 15, 16, and 17, respectively, which contact the containers for a total of at least about 2 minutes with a fluid maintained at a temperature below about 100° F., thereby incrementally cooling the containers until they reach the desired temperature. Each spray apparatus is supplied with fluid from a cooling tower through cooling water heat exchanger 4. Fluid discharged by each spray apparatus is collected in the tunnel and can be transferred by means of pumps 18, 19 and 20, respectively associated with each spray station to the cooling water heat exchanger 4, thereby providing the first heat exchanger with a secondary source of fluid that has been heated by its contact with the containers in the tunnel. The fluid in each spray apparatus can be liquid such as water.

In an alternative embodiment of the invention, in which air cooling for the containers is used, the containers can be transported on spiral ramps to reduce floor space requirements. For example, the containers can be carried on an upward spiral during the initial period at ambient conditions, and then on a downward spiral ramp during air cooling. Optionally, a washing station between the two ramps can be provided. When air cooling is used, the air can be at ambient temperatures or chilled to sub-ambient temperatures.

After cooling, the containers can be dried as needed, by conventional means. The containers are then packaged for shipment.

The film used in the preparation of pouches in the present invention should generally comprise a core barrier layer with sealable thermoplastic on the exterior of the core. Typically, the barrier core has an adhesion promotion layer on each surface, to which the thermoplastic heat sealable layer is attached. One particularly desirable material for use in the present invention includes a barrier layer of ethylene vinyl alcohol polymer, a tie layer or adhesion promotion layer on each surface of the barrier layer, and low density linear polyethylene as the heat sealable layer. Typically, one surface of the film is printed, in which case the printed surface is subsequently lacquered. When the film is printed, the printing is generally carried out before the film is formed into a pouch.

The thickness of the film used in the present invention will vary depending on the size of the pouch being formed. However, for containers of up to 16 fluid ounces, film having a thickness of at least about 80 microns, and preferably at least about 100 microns, can be used. One particularly satisfactory heat sealable film that can be used in the present invention is that available from DuPont Company, commercially available as CK805 heat sealable film.

Prior to treatment according to the present invention, the juice is typically stored in holding tanks after being extracted from the fruit, where it is maintained at refrigeration temperatures, for example, of about from 32° to 40° F. It is particularly desirable to store the refrigerated juice for less than about twenty-four hours before treatment and packaging according to the instant invention.

The present invention provides a desirable combination of advantages. Specifically, the present invention provides a means for preparing and packaging beverages such as 100% natural juices such that the packaged product can be transported and stored without refrigeration. One advantage provided by the present invention is the elimination of the need for additives or preservatives. A related advantage is the elimination of refrigeration requirement. Because the packaged product does not require refrigeration, it can be more conveniently and efficiently transported and stored. In addition, given the environmental impact of the materials used in the refrigeration process, as well as the significant energy requirements associated with refrigeration, a natural product that can be transported and stored without refrigeration is desirable.

The present invention provides the consumer with further benefits, including the fact that the packaged product can be stored on the shelf at home, freeing space in the refrigerator for other products. In addition, the packaged product and can be taken to lunch or otherwise transported, maintaining its quality without the need for refrigeration. The consumer is provided with an all natural product that stays fresh longer, has no preservatives or additives, requires no refrigeration or other costly maintenance, and can be transported to the office, to school, or to a picnic without needing ice or other cooling means.

While the process of the present invention provides the producer, the transporter, the retailer, and the consumer with the above advantages, it also permits the use of packaging which has significantly less environmental impact, requiring less raw materials, less energy to produce, providing greater recyclability, in addition to the functional advantages detailed above.

I claim:

1. A process for the continuous processing and packaging of juice comprising the sequential steps of:
    (a) heating the juice to a heated temperature of about from 185° to 205° F. in a closed conduit;

(b) maintaining the heated temperature of the juice while it is in the conduit for a residence time of about from 0.5 to 3 minutes;

(c) passing the heated juice into a distribution tank which has a height to diameter ratio of at least about 5 to 1 and maintaining the level of the heated juice in the distribution tank at a substantially constant level such that the height to diameter ratio and the substantially constant level of heated juice in the tank ensures a substantially constant flow of heated juice through the distribution tank thus allowing all juice processed through the tank to be maintained in the tank for substantially the same period;

(d) passing the heated juice from the distribution tank by at least one conduit and filling pouches comprising a gas impermeable polymeric film with the heated juice from the tank wherein the heated juice filling the pouch is at the heated temperature;

(e) sealing the top of each filled pouch;

(f) maintaining each sealed and filled pouch at ambient conditions for at least about 1 minute; and then (g) contacting each sealed and filled pouch for at least about 2 minutes with fluid maintained at a temperature below about 100° F. to cool the heated juice in the sealed and filled pouch to a temperature of less than about 100° F. such that said steps produce a packaged juice that is shelf stable at room temperature in the sealed pouch for at least six month without preservatives.

2. A process of claim 1 wherein the height to diameter ratio of the distribution tank is at least about 8 to 1.

3. A process of claim 1 wherein the fluid is air.

4. A process of claim 3 wherein the sealed pouches are contacted with air for at least about 6 minutes to cool the juice in the container to less than about 100° F.

5. A process of claim 1 wherein the fluid is water.

6. A process of claim 5 wherein the water is sprayed onto the sealed and filled pouches.

7. A process of claim 6 wherein the water is sprayed onto the sealed and filled pouches in at least two successive stages.

8. A process of claim 1 wherein the pouches are filled with the heated juice through at least two feeding heads.

9. A process of claim 1 wherein the level of the distribution tank is maintained by valving and sensing devices.

10. A process of claim 1 wherein the pouches are made from a laminar polymeric film comprising a core of polymeric ethylene vinyl alcohol and outer layers of heat sealable polyolefin.

11. A process of claim 10 wherein the polyolefin consists essentially of linear low density polyethylene.

12. A process of claim 1 wherein the pouches are filled with the heated juice to provide a head space of up to 5%, and the head space is filled with nitrogen gas.

13. A process of claim 1 further comprising providing up to about 10% head space in the distribution tank.

14. A process of claim 13 further comprising supplying nitrogen to the head space in the distribution tank.

15. An apparatus for continuous processing and packaging of juice comprising:

(a) a closed conduit and means for heating the juice to a heated temperature of about from 185° to 205° F. in the closed conduit;

(b) means for maintaining the heated temperature of the juice while it is in the closed conduit for a residence time of about from 0.5 to 3 minutes;

(c) a distribution tank and means for passing the heated juice into the distribution tank, the distribution tank having a height to diameter ratio of at least about 5 to 1 and means for maintaining the level of the heated juice in the distribution tank at a substantially constant level such that the height to diameter ratio and the substantially constant level of heated juice in the tank ensures a substantially constant flow of heated juice through the distribution tank thus allowing all juice processed through the tank to be maintained in the tank for substantially the same period;

(d) at least one additional conduit for passing the heated juice from the distribution tank and means for filling pouches comprising a gas impermeable polymeric film with the heated juice from the tank wherein the heated juice filling the pouch is at the heated temperature;

(e) means for sealing the top of each filled pouch;

(f) means for maintaining each sealed and filled pouch at ambient conditions for at least about 1 minute; and (g) means for contacting each sealed and filled pouch for at least about 2 minutes with fluid maintained at a temperature below about 100° F. to cool the heated juice in the sealed and filled pouches to a temperature of less than about 100° F. such that said apparatus for continuous processing and packaging the juice produces a packaged juice that is shelf stable at room temperature in the sealed pouch for at least six months without preservatives.

* * * * *